(No Model.) 2 Sheets—Sheet 1.
J. B. HILLIARD.
CHEMICAL APPARATUS.
No. 582,473. Patented May 11, 1897.
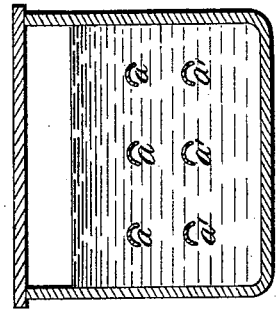
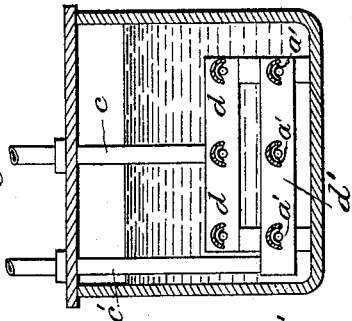
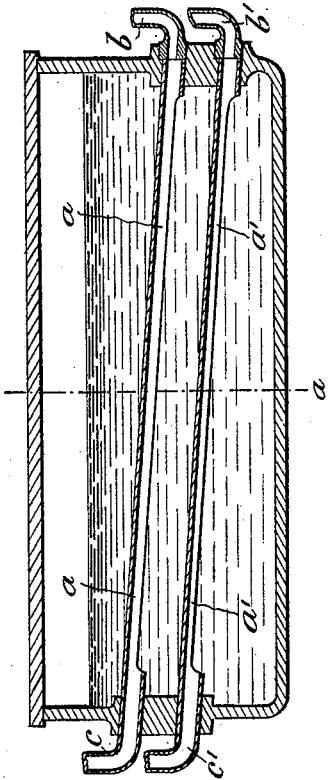
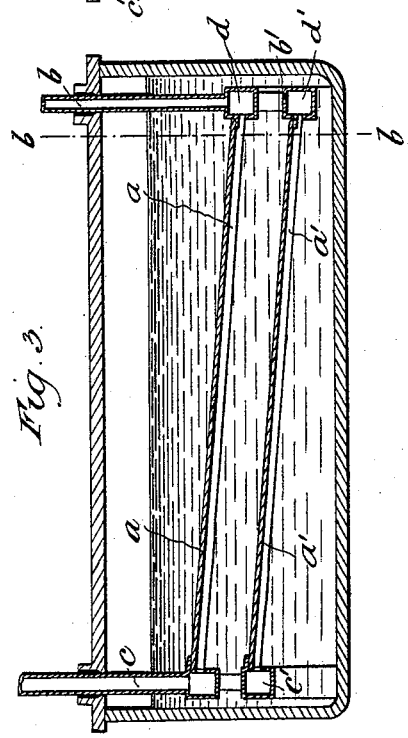
Witnesses.
Walter E. Allen.
Jas. M. White
Inventor.
Joseph Banks Hilliard.
By Knight Bros
Attorneys

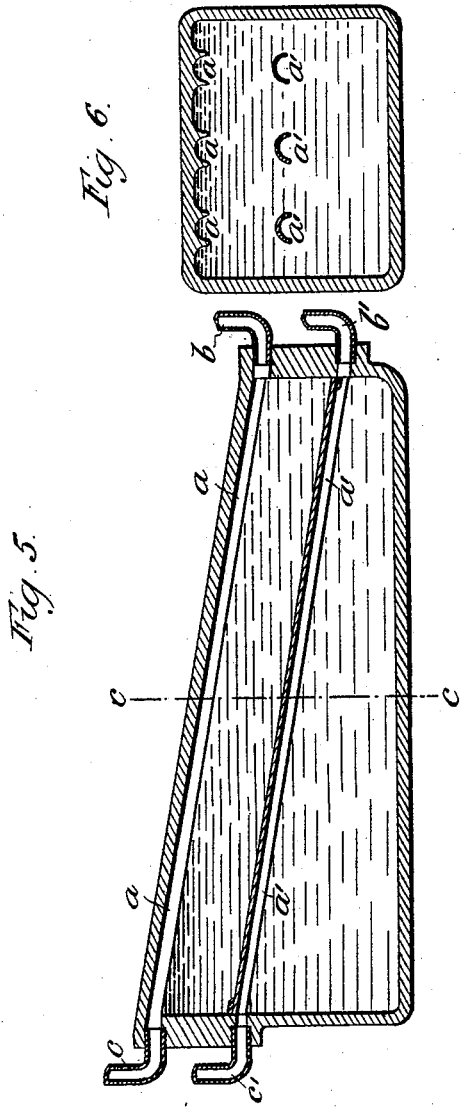

UNITED STATES PATENT OFFICE.

JOSEPH B. HILLIARD, OF GLASGOW, SCOTLAND.

CHEMICAL APPARATUS.

SPECIFICATION forming part of Letters Patent No. 582,473, dated May 11, 1897.

Application filed October 19, 1895. Serial No. 566,225. (No model.) Patented in England January 1, 1894, No. 24, and in Germany October 28, 1894, No. 83,288.

*To all whom it may concern:*

Be it known that I, JOSEPH BANKS HILLIARD, surgical-instrument maker, a subject of the Queen of Great Britain and Ireland, residing at 65 Renfield Street, in the city of Glasgow, Scotland, have invented an Improved Apparatus for Preventing Gases from Intermingling While Passing Through Liquids, (for which I have obtained patents in Great Britain, No. 24, dated January 1, 1894, and in Germany, No. 83,288, dated October 28, 1894,) of which the following is a specification.

This invention relates to apparatus for preventing gases from intermingling while passing through and in contact with a liquid and is applicable to many processes, but more particularly in the making of chlorin gas, as it allows the chemist to utilize the oxygen in the atmosphere during the process without allowing the other constituents of the atmosphere to mix with and spoil or adulterate the chlorin gas.

In carrying out my invention I provide suitable inclined guiding inverted approximately semicircular open channels in a tank containing the liquid—as, for example, acid. I liberate the gas at the lower end of these channels. It travels along them to the higher end, where it escapes up a tube or other exit above the surface of the liquid. Each set of channels has an independent separate entrance and exit, so that different gases may pass through and in contact with the same liquid and be discharged, when desired, without having intermingled. The top of the tank or vessel may act as a channel for one gas, while the other gases pass along other submerged channels placed suitably for them. The similarly-shaped channels may be attached to the tank or left unattached and supported in the fluid by suitable floats. The channels may be inclined at different angles to produce different speeds in the passage of the gases.

In the drawings, Figure 1 is a vertical longitudinal section of a tank. Fig. 2 is a vertical cross-section of the same on the line $a\,a$, Fig. 1. Fig. 3 is a longitudinal section of a tank with the channels unattached and supported by floats. Fig. 4 is a vertical cross-section of the tank. Fig. 5 is a closed vessel in which the top of the vessel acts as a channel for one of the gases. Fig. 6 is a cross-section of the vessel on the line $c\,c$, Fig. 5.

$a\,a'$ are the channels, which are preferably of a semicircular shape in cross-section, as shown at Figs. 2, 4, and 6. Each channel has an independent pipe $b\,b'$ attached to its lower end, through which one gas can be introduced to the liquid.

The gas passes along the channel without being allowed to mix with the gases in the other channels and escapes from the tank by an independent pipe $c$ or $c'$. In Fig. 3 the channels $a$ and $a'$ and exit and entrance pipes $b\,b'$ and $c\,c'$ are supported on the floats $d\,d'$.

In Fig. 5 one gas is introduced by the pipe $b$ to the channels $a$ and passes along the channels to the exit-pipe $c$, while the other gas enters by the pipe $b'$, passes along the top channels, and escapes by the pipe $c'$.

I claim—

1. An apparatus for preventing gases from intermingling while passing through liquids comprising a tank having separate and independent inclined inverted open channels, entrance-pipes connected with the lower ends of the channels and escape-pipes connected with the upper ends of the channels; substantially as described.

2. An apparatus for preventing gases from intermingling while passing through liquids comprising a tank having separate and independent inclined inverted open channels and floats on which the ends of the channels are supported, and entrance and escape pipes connected with the channels through the floats, substantially as described.

In testimony whereof I have signed my name to this specification in the presence of two witnesses.

J. B. HILLIARD.

Witnesses:
  JOHN SIDDLE,
  ARTHUR HARTLEY YUILE.